UNITED STATES PATENT OFFICE.

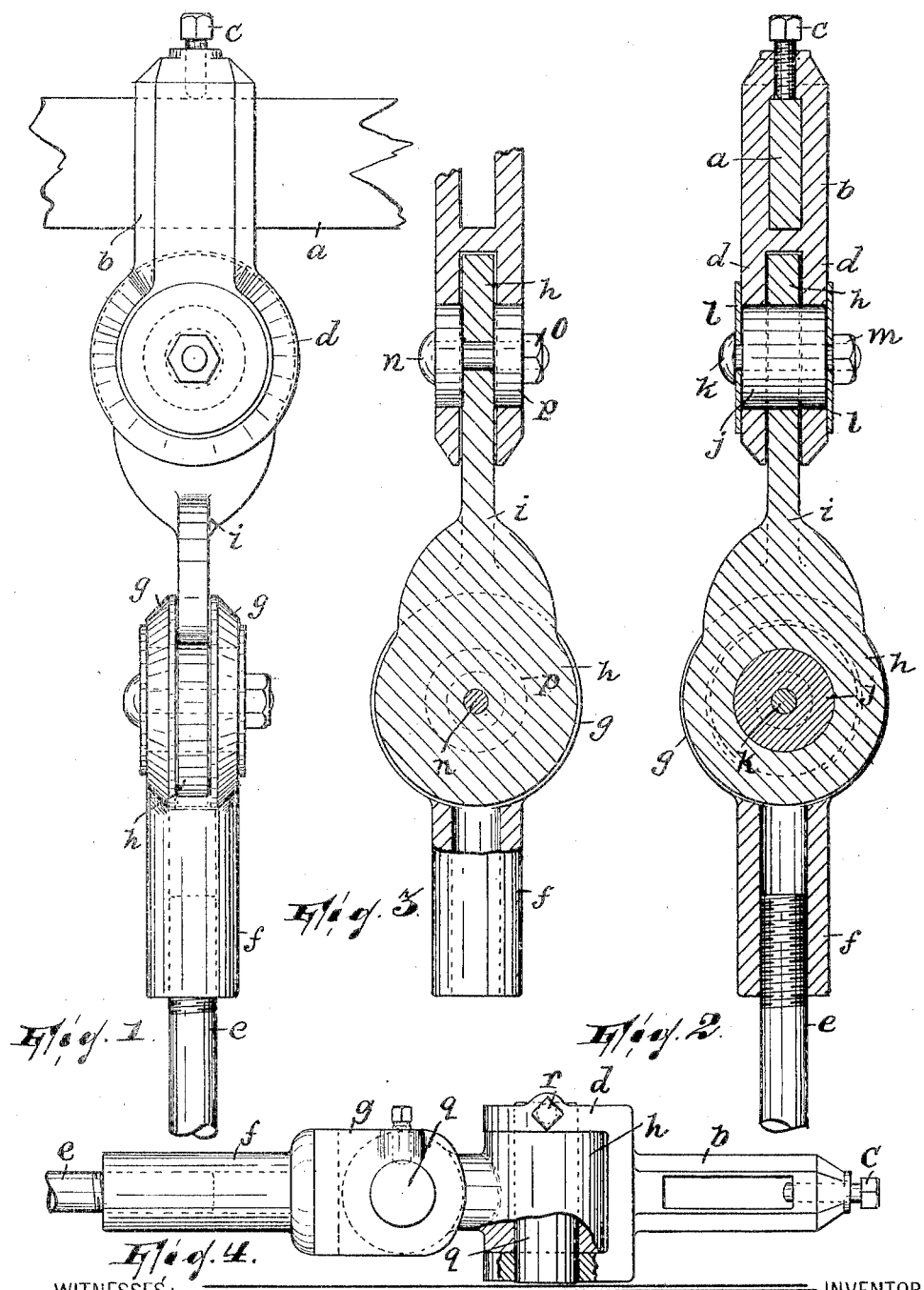

WILLIAM CRUTCHLOW, OF PATERSON, NEW JERSEY.

KNUCKLE-JOINT.

No. 797,267.        Specification of Letters Patent.        Patented Aug. 15, 1905.

Application filed May 9, 1905. Serial No. 259,604.

*To all whom it may concern:*

Be it known that I, WILLIAM CRUTCHLOW, a citizen of the United States, residing in Paterson, Passaic county, New Jersey, have invented certain new and useful Improvements in Knuckle-Joints; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

My invention relates to flexible connections, known in the art as "knuckle-joints," between the actuating-levers for jacquard-machines and the cranks from which said levers are moved. These devices ordinarily comprise in the more recent development of the art three members pivotally connected together in such manner that the end members stand in intersecting planes, the parts which form the pivots being separable or detachable.

My invention has for its object to provide these parts, which will be herein designated as the "pivot parts," with broad bearing-surfaces, so as to increase the wear thereof and to also make said parts of broad or appreciable diameter where they stand in the end members, which are usually forked or bifurcated, so that loosening or freedom of movement will not so quickly accrue as heretofore between said parts and the end members as the result of the continual pounding and intermittent strain to which the device in use is subjected.

In the accompanying drawings, Figure 1 is a side view of one form of my improved knuckle-joint. Fig. 2 is a vertical sectional view thereof, showing certain parts in elevation. Fig. 3 is a vertical sectional view of another form of the knuckle-joint; and Fig. 4 is a side view, partly in section, of still another form of the joint.

In the drawings, $a$ represents a jacquard-lever, and $b$ the loop portion fitted onto said lever and adjustably secured thereto by a set-screw $c$ of one of the end members of the knuckle-joint. $d$ is the forked or bifurcated portion of said member, the same being, as usual, in the form of two spaced disks standing parallel to each other.

$e$ is a rod which may be connected with a suitable rotating crank of the loom and which is screwed into the tubular portion $f$ of the other end member of the knuckle-joint, said other end member also having a forked portion $g$ like the forked portion $d$ of the first-mentioned end member.

$i$ is the intermediate or connecting member, the same having its end portion $h$ arranged in the forked portions of the end members.

Referring to Figs. 1 and 2, the pivot parts here shown are cylindrical blocks $j$ of relatively large diameter held in place in the portions $d$ and $h$, which they penetrate, by washers $l$, taking against the outer faces of the portions $d$, and bolts $k$, having nuts $m$ and penetrating the blocks and the washers. The portions $h$ have their bearing on the blocks, which latter may, if desired, be clamped up tight by the bolt $k$ and nut $m$, so as not to turn in the forked portions $d$.

In Fig. 3 the pivot parts consist in each instance of a bolt $n$, a nut $o$ thereon, and two disks $p$ of relatively large diameter, said disks being clamped to the sides of the portions $h$ by the bolt and nut and having bearing in the forked portions $d$.

In Fig. 4 the pivot parts are wrist-pins $q$ of appreciable diameter and of plain cylindrical form, the same penetrating the portions $d$ of the end members and the portions $h$ of the intermediate member and being in each instance secured to the one or the other of the two members (end and intermediate) which they penetrate by a set-screw $r$. In this last instance the parts may be made more durable and stronger by thickening up the portions $h$ and spacing the portions $d$ accordingly, as shown.

In view of the foregoing it will appear that my knuckle-joint has increased strength and durability, because the pivot parts are of large diameter where the bearings come and where they stand in the portions $d$ of the end members of the joint, on the one hand resisting the wear resulting from frictional action and on the other protracting the loosening which comes in the portions $d$ as the result of the pounding action to which the joint is constantly subjected.

Having thus fully described my invention, what I claim, and desire to secure by Letters Patent of the United States, is—

1. In a knuckle-joint, the combination of two substantially similar end members disposed in intersecting planes and each having a forked portion, an intermediate member having its extremities received by the forked portions of said end members, and pivot parts affording bearings between each end member and the intermediate member, said pivot parts penetrating the forked portions of the end members and the intermediate member and having relatively large diameters where they stand in the forked portions of the end members, substantially as described.

2. In a knuckle-joint, the combination of two substantially similar end members disposed in intersecting planes and each having a forked portion, an intermediate member having its extremities received by the forked portions of said end members, and pivot parts affording bearings between each end member and the intermediate member and secured in one of said members against rotation, said pivot parts penetrating the forked portions of the end members and the intermediate member and having relatively large diameters where they stand in the forked portions of said end members, substantially as described.

In testimony that I claim the foregoing I have hereunto set my hand this 6th day of May, 1905.

WILLIAM CRUTCHLOW.

Witnesses:
    JOHN W. STEWARD,
    WM. D. BELL.